US012107977B2

(12) United States Patent
Deng et al.

(10) Patent No.: US 12,107,977 B2
(45) Date of Patent: Oct. 1, 2024

(54) ROTATION CONNECTION COMPONENT AND FOLDABLE MOBILE TERMINAL (71) Applicant: VIVO MOBILE COMMUNICATION CO., LTD., Guangdong (CN)

(72) Inventors: Yongjin Deng, Dongguan (CN); Jingqiu Ma, Dongguan (CN); Jingwei Xu, Dongguan (CN); Zhengjun Luo, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 400 days.

(21) Appl. No.: 17/333,863

(22) Filed: May 28, 2021

(65) Prior Publication Data

US 2021/0289063 A1 Sep. 16, 2021

Related U.S. Application Data (63) Continuation of application No. PCT/CN2019/119909, filed on Nov. 21, 2019.

(30) Foreign Application Priority Data

Nov. 30, 2018 (CN) .................. 201811459285.X (51) Int. Cl.
H04M 1/02 (2006.01)
G06F 1/16 (2006.01)

(52) U.S. Cl.
CPC ........ *H04M 1/0216* (2013.01); *G06F 1/1616* (2013.01); *G06F 1/1681* (2013.01);
(Continued)

(58) Field of Classification Search
None
See application file for complete search history.

(56) References Cited

U.S. PATENT DOCUMENTS 10,001,815 B1 6/2018 Yao et al.
2015/0342067 A1* 11/2015 Gault ................... H05K 5/0234
16/342

(Continued)

FOREIGN PATENT DOCUMENTS

CN 201657033 U 11/2010
CN 106028701 A 10/2016
(Continued)

OTHER PUBLICATIONS

International Search Report and Written Opinion of the International Searching Authority regarding International Patent Application No. PCT/CN2019/119909, dated Feb. 26, 2020. Translation provided by Bohui Intellectual Property.

(Continued)

*Primary Examiner* — Gennadiy Tsvey
(74) *Attorney, Agent, or Firm* — Harness, Dickey & Pierce, P.L.C.

(57) ABSTRACT

A rotation connection component includes: a first base, a second base, and a connection clamp. The second base is rotationally connected to the first base through the connection clamp, the connection clamp is slidably connected to the first base, the rotation connection component has an unfolded state and a folded state. In the folded state, the connection clamp slides into the first base. In the unfolded state, at least a portion of the connection clamp slides from the first base, and the second base rotates by a preset angle relative to the first base.

10 Claims, 5 Drawing Sheets (52) U.S. Cl.
CPC ...... *H04M 1/0266* (2013.01); *H04M 2201/38* (2013.01); *H04M 2250/16* (2013.01)

(56) References Cited

U.S. PATENT DOCUMENTS

| | | | |
|---|---|---|---|
| 2017/0192460 A1 | 7/2017 | Watanabe et al. | |
| 2018/0092223 A1 | 3/2018 | Hsu | |
| 2018/0113491 A1* | 4/2018 | Park | G06F 1/166 |
| 2018/0129253 A1 | 5/2018 | Siddiqui | |
| 2018/0224900 A1* | 8/2018 | Senatori | G06F 1/1681 |
| 2018/0224901 A1* | 8/2018 | Senatori | G06F 1/1616 |
| 2018/0275725 A1 | 9/2018 | Lin et al. | |
| 2018/0313399 A1 | 11/2018 | Nakamura | |
| 2021/0207648 A1* | 7/2021 | Chen | H05K 5/0226 |

FOREIGN PATENT DOCUMENTS

| | | |
|---|---|---|
| CN | 106125841 A | 11/2016 |
| CN | 106233362 A | 12/2016 |
| CN | 107735743 A | 2/2018 |
| CN | 207123328 U | 3/2018 |
| CN | 107928129 A | 4/2018 |
| CN | 207475636 U | 6/2018 |
| CN | 108496016 A | 9/2018 |
| CN | 108769317 A | 11/2018 |
| CN | 108900661 A | 11/2018 |
| CN | 208143283 U | 11/2018 |
| CN | 109451112 A | 3/2019 |
| EP | 1551157 A1 | 7/2005 |
| JP | 2003056547 A | 2/2003 |
| KR | 1020050071747 | 7/2005 |
| TW | M550964 U | 10/2017 |
| WO | WO-2018194605 A1 | 10/2018 |

OTHER PUBLICATIONS

First Office Action regarding Chinese Patent Application No. 201811459285.X, dated Nov. 29, 2019. Translation provided by Bohui Intellectual Property.

Second Office Action regarding Chinese Patent Application No. 201811459285.X, dated Jun. 1, 2020. Translation provided by Bohui Intellectual Property.

Third Office Action regarding Chinese Patent Application No. 201811459285.X, dated Sep. 11, 2020. Translation provided by Bohui Intellectual Property.

Supplementary European Search Report regarding Patent Application No. 19890728.9-1216/3890283; PCT/CN2019/119909, dated Dec. 10, 2021.

* cited by examiner

ROTATION CONNECTION COMPONENT AND FOLDABLE MOBILE TERMINAL

CROSS-REFERENCE OF RELATED APPLICATIONS

This application is a Bypass Continuation Application of PCT/CN2019/119909 filed on Nov. 21, 2019, which claims priority to Chinese Patent Application No. 201811459285.X filed on Nov. 30, 2018, which are incorporated herein by reference in their entirety.

TECHNICAL FIELD

The present disclosure relates to a rotation connection component and a foldable mobile terminal.

BACKGROUND

As user requirements become higher, screen ratios of mobile terminals in related art become larger and larger. Larger screens can not only improve the appearance performance of mobile terminals, but also improve display performance. Large-screen mobile terminals are more and more popular among users.

For mobile terminals, portability usually needs to be considered. The overall size of a large-screen mobile terminal in related art is larger. Although the screen area can be greatly increased, portability is poor. The larger overall size makes it difficult for users to hold and affects the user's carrying of the mobile terminal. Therefore, foldable mobile terminals come into being. Foldable mobile terminals can be folded in one direction, thereby reducing the sizes of the mobile terminals.

SUMMARY

In a first aspect, some embodiments of the present disclosure provide a rotation connection component. The rotation connection component includes: a first base, a second base, and a connection clamp, where the second base is rotationally connected to the first base through the connection clamp, the connection clamp is slidably connected to the first base, the rotation connection component has an unfolded state and a folded state, in the folded state, the connection clamp slides into the first base; in the unfolded state, at least a portion of the connection clamp slides from the first base, and the second base rotates by a preset angle relative to the first base.

In a second aspect, some embodiments of the present disclosure provide a foldable mobile terminal. The foldable mobile terminal includes: a first folding portion, a second folding portion, and the above rotation connection component, the first folding portion is connected to the first base, and the second folding portion is connected to the second base.

BRIEF DESCRIPTION OF DRAWINGS

The accompanying drawings illustrated herein are provided to further understand the present disclosure and form a portion of the present disclosure. The exemplary embodiments of the present disclosure and the descriptions thereof are used to explain the present disclosure and do not constitute an improper limitation on the present disclosure. In the accompanying drawings.

Description of reference numerals in the accompanying drawing:

101—first folding portion, 102—second folding portion, 103—rotation shaft;
100—first base, 110—first curved sliding hole, 111—first locking portion,
200—second base,
300—connection clamp, 310—first connection sub-clamp, 311—second locking portion, 312—second curved sliding hole, 313—third locking portion, 320—second connection sub-clamp, 321—fourth locking portion,
400—first folding portion, 410—first housing, 420—first display screen, 430—first connection hole,
500—second folding portion, 510—second housing, 520—second display screen, 530—second connection hole;
600—rotation connection component.

DETAILED DESCRIPTION OF EMBODIMENTS

To make the objectives, technical solutions, and advantages of the present disclosure clearer, the following clearly describes the technical solutions in the present disclosure with reference to specific embodiments of the present disclosure and the corresponding accompanying drawings. Apparently, the described embodiments are some rather than all of the embodiments of the present disclosure. All other embodiments obtained by a person of ordinary skill in the art based on the embodiments of the present disclosure shall fall within the protection scope of the present disclosure.

Figure 1:
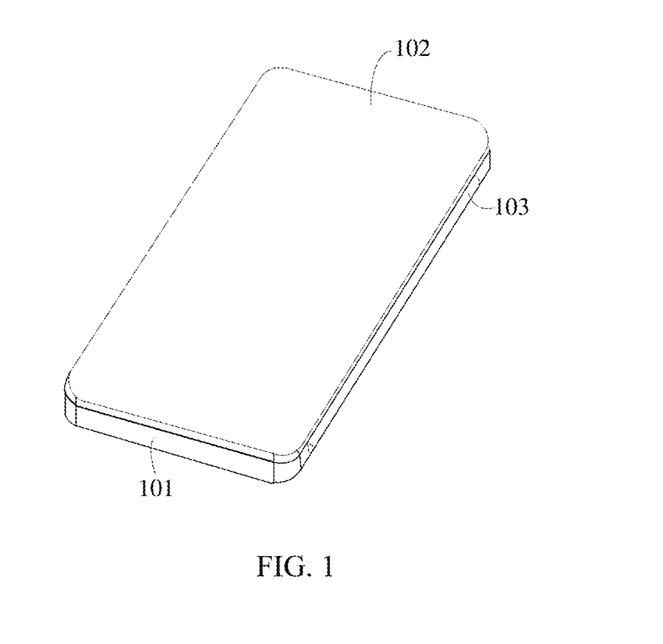
FIG. 1 is a schematic diagram of a foldable mobile terminal in a folded state in some embodiments.
Figure 2:
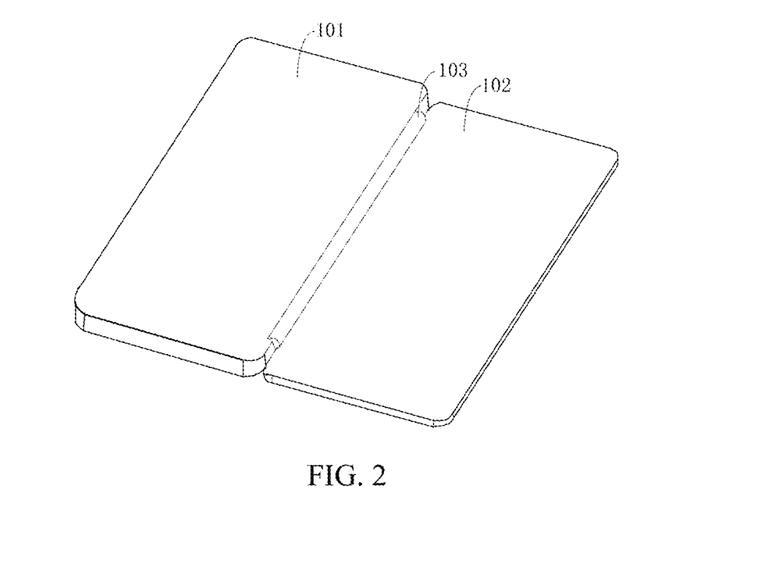
FIG. 2 is a schematic diagram of a foldable mobile terminal in an unfolded state in some embodiments.

Generally, two portions of a foldable mobile terminal that can be folded with each other are rotationally connected through a rotation shaft. As shown in FIG. 1 and FIG. 2, a first folding portion 101 and a second folding portion 102 are rotationally connected through a rotation shaft 103. In the state shown in FIG. 1, the first folding portion 101 and the second folding portion 102 are folded through rotation. In the state shown in FIG. 2, the first folding portion 101 and the second folding portion 102 are extended through rotation. In the folded state, the rotation shaft 103 is exposed, which affects the user's holding of the mobile terminal. At the same time, the exposure of the rotation shaft 103 affects the appearance performance of the mobile terminal.

Referring to FIG. 3 to FIG. 9, the embodiments of the present disclosure disclose a rotation connection component, and the disclosed rotation connection component includes a first base 100, a second base 200, and a connection clamp 300.

The first base 100 and the second base 200 are both connection members of the rotation connection component, and are configured to assemble the rotation connection component and another member. In the embodiments, when the rotation connection component is configured to connect to two folding portions of a foldable mobile terminal, the first base 100 and the second base 200 are configured to separately connect to the two folding portions.

The second base 200 is rotationally connected to the first base 100 through the connection clamp 300, so that the second base 200 can rotate relative to the first base 100. In the embodiments, the rotation connection component has an unfolded state and a folded state. When the rotation connection component is configured to connect to the two folding portions of the foldable mobile terminal, the rotation connection component switches between the unfolded state and the folded state, so that the foldable mobile terminal extends or folds.

In the embodiments, the connection clamp 300 is slidably connected to the first base 100. For example, the first base 100 may have a guide rail, and the connection clamp 300 and the guide rail slidably cooperate, to improve stability of sliding of the connection clamp 300. In this case, because the second base 200 is connected to the first base 100 through the connection clamp 300, the connection clamp 300 and the guide rail slide relative to each other, so that the second base 200 and the first base 100 rotationally cooperate.

When the rotation connection component is in the folded state, the connection clamp 300 slides into the first base 100 to implement folding. When the rotation connection component is in the unfolded state, at least a portion of the connection clamp 300 slides from the first base 100, and the second base 200 rotates by a preset angle relative to the first base 100. Certainly, the preset angle is greater than 0. It should be noted that rotating by a preset angle refers to that in a process in which the rotation connection component switches from the folded state to the unfolded state, the first base 100 and the second base 200 need to rotate by an angle relative to each other.

The connection clamp 300 and the first base 100 slidably cooperate, so that the two have a folding capability, that is, the connection clamp 300 can fold and extend through movement.

In the rotation connection component disclosed in the embodiments of the present disclosure, the second base 200 is rotationally connected to the first base 100 through the connection clamp 300, and the connection clamp 300 and the first base 100 are slidably connected, so that the second base 200 slides relative to the first base 100 and the two switch between the unfolded state and the folded state. The connection clamp 300 and the first base 100 are slidably fitted in the rotation direction, thereby implementing folding or extension of the connection clamp 300 and achieving a desirable folding effect. By using the rotation connection component of this structure, when the two folding portions of the foldable mobile terminal are connected, exposure can be avoided. Therefore, this prevents exposure from affecting user's holding. At the same time, the above rotation connection component can also improve appearance performance.

In the embodiments, the guide rail can perform a guiding function, to further improve stability of sliding of the connection clamp 300, and the guide rail may have multiple structures. In some examples, the guide rail may be a first curved sliding hole 110 provided on the first base 100, and an extending direction of the first curved sliding hole 110 is the same as a rotation direction of the second base 200 or the first base 100. The connection clamp 300 is disposed inside the first curved sliding hole 110, to slide along the first curved sliding hole 110. In this structure, the guide rail is the first curved sliding hole 110 slidably sleeved on the connection clamp 300, and this slidable sleeving manner undoubtedly can improve stability of relative sliding.

To prevent the connection clamp 300 from detaching from the first curved sliding hole 110 during sliding, in an optional solution, the first locking portion 111 may be disposed inside the first curved sliding hole 110, the second locking portion 311 may be disposed on the connection clamp 300, and the second locking portion 311 is matched with the first locking portion 111 by position-limiting-fit in the rotation direction. The second locking portion 311 is matched with the first locking portion 111 by position-limiting-fit, to prevent the connection clamp 300 from detaching from the first curved sliding hole 110.

The first locking portion 111 and the second locking portion 311 restrict rotation of the connection clamp 300 to some extent without affecting rotation of the connection clamp 300 relative to the first curved sliding hole 110. The first locking portion 111 and the second locking portion 311 may be disposed at multiple positions. For example, the first locking portion 111 may be disposed at a tail end of the first curved sliding hole 110, and the second locking portion 311 may be disposed at an end of the connection clamp 300 away from the second base 200. Positions at which the first locking portion 111 and the second locking portion 311 are disposed can ensure the rotation angle of the connection clamp 300 to a large extent.

The connection clamp 300 may have multiple structures. In some embodiments of the present disclosure disclose, the disclosed connection clamp 300 may include at least two connection sub-clamps, and the at least two connection sub-clamps are connected one by one and disposed between the first base 100 and the second base 200. Two adjacent connection sub-clamps may be matched in a sleeve-fit manner. The two adjacent connection sub-clamps are matched by slip-fit in the rotation direction in which the second base 200 slides relative to the first base 100. In this case, the connection clamp 300 is a telescopic mechanism, and can extend and fold through the slidable sleeving between the two neighboring connection sub-clamps, and therefore can switch between the folded state and the unfolded state.

When the connection clamp 300 is in the unfolded state, the entire rotation connection component is also in the unfolded state; and when the connection clamp 300 is in the folded state, the entire rotation connection component is also in the folded state.

Figure 3:
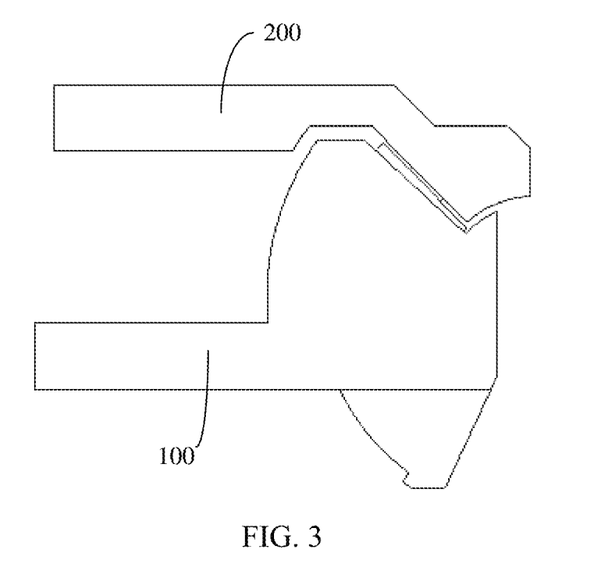
FIG. 3 is a schematic diagram of a rotation connection component in a folded state according to an embodiment of the present disclosure.
Figure 4:
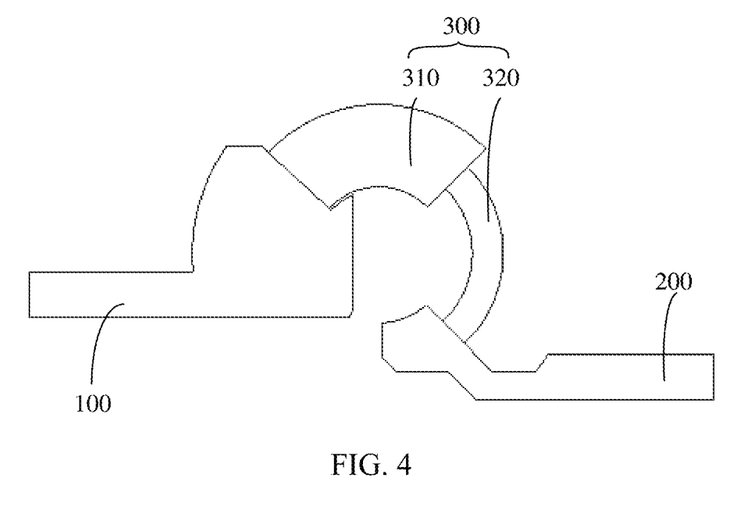
FIG. 4 is a schematic diagram of a rotation connection component in an unfolded state according to an embodiment of the present disclosure.

For example, Referring to FIG. 3 to FIG. 5 again, there may be two connection sub-clamps, the two connection sub-clamps are a first connection sub-clamp 310 and a second connection sub-clamp 320, the first connection sub-clamp 310 and the second connection sub-clamp 320 are sequentially connected between the first base 100 and the second base 200, the first connection sub-clamp 310 has a second curved sliding hole 312, and the second connection sub-clamp 320 is disposed inside the second curved sliding hole 312 and matched with the second curved sliding hole 312 by slip-fit in the rotation direction. The first connection sub-clamp 310 has the second curved sliding hole 312 sleeved on the second connection sub-clamp 320, and this slidable sleeving mounting manner undoubtedly can improve stability of sliding.

Figure 5:
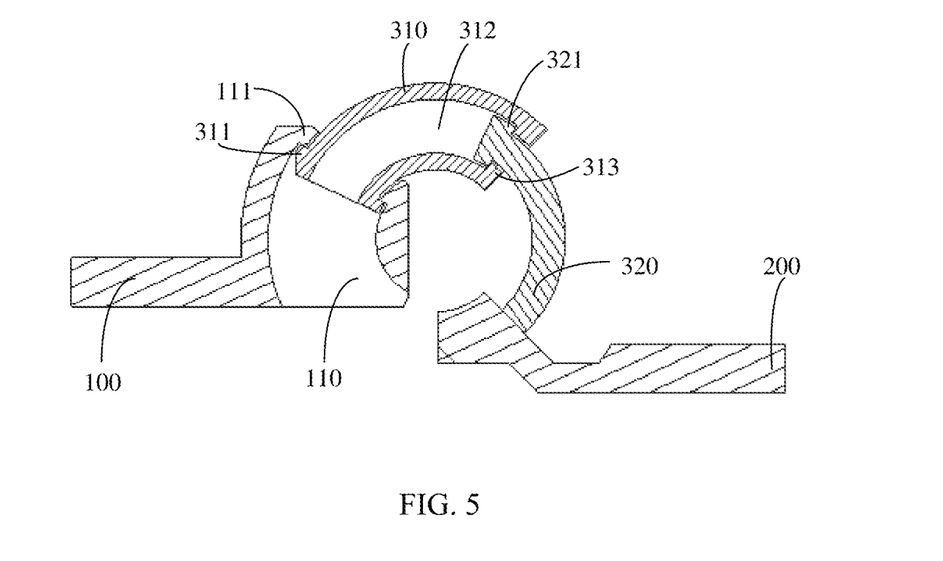
FIG. 5 is a cross-sectional view of FIG. 4.

Similarly, to prevent the second connection sub-clamp 320 from detaching from the second curved sliding hole 312, in an optional solution, the third locking portion 313 may be disposed inside the second curved sliding hole 312, the fourth locking portion 321 may be disposed on the second connection sub-clamp 320, and the third locking portion 313 is matched with the fourth locking portion 321 by position-limiting-fit. It should be noted that the third locking portion 313 is matched with the fourth locking portion 321 refers to that the second connection sub-clamp 320 is not detached from the second curved sliding hole 312 while ensuring that the second connection sub-clamp 320 rotates relative to the first connection sub-clamp 310.

The third locking portion 313 may be disposed at the tail end of the second curved sliding hole 312, and the fourth locking portion 321 may be disposed at an end of the second connection sub-clamp 320 away from the second base 200.

To improve connection strength, the first base 100, the second base 200, and the connection clamp 300 can all be made of metal materials with high strength. For example, the first base 100, the second base 200, and the connection clamp 300 can all be stainless steel structural members.

Figure 6:
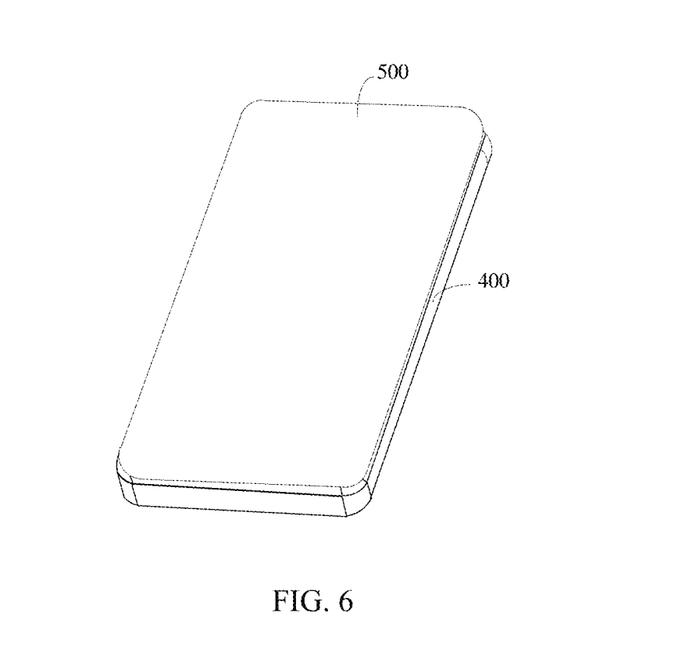
FIG. 6 is a schematic diagram of a foldable mobile terminal in a folded state according to an embodiment of the present disclosure.
Figure 7:
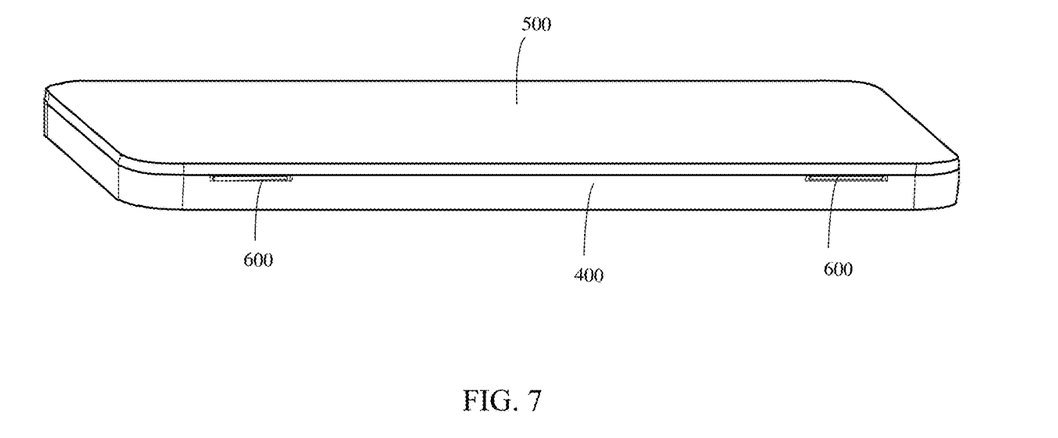
FIG. 7 is a schematic diagram of FIG. 6 at another viewing angle.
Figure 8:
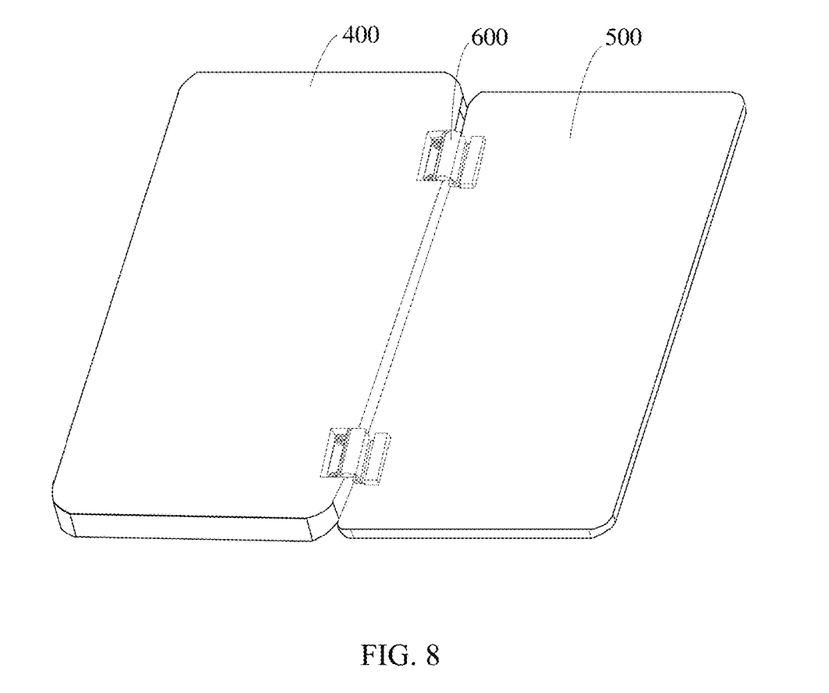
FIG. 8 is a schematic diagram of a foldable mobile terminal in an unfolded state according to an embodiment of the present disclosure.
Figure 9:
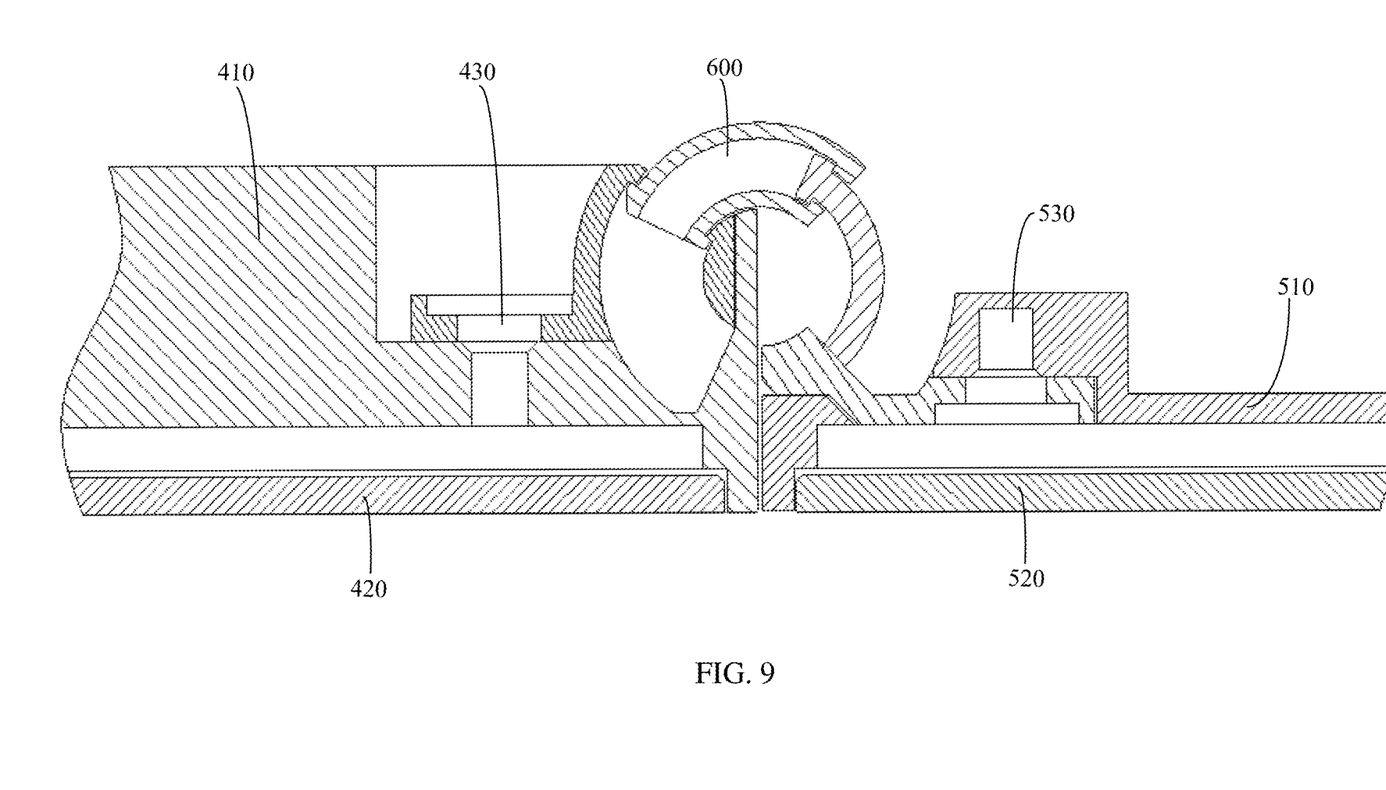
FIG. 9 is an enlarged schematic cross-sectional diagram of a portion of FIG. 8.

Based on the rotation connection component disclosed in the embodiments of the present disclosure, the embodiments of the present disclosure further disclose a foldable mobile terminal. Referring to FIG. 6 to FIG. 9 again, the disclosed foldable mobile terminal includes a first folding portion 400, a second folding portion 500, and the rotation connection component 600 in the foregoing embodiments.

The first folding portion 400 is connected to the first base 100, the second folding portion 500 is connected to the second base 200, and the second base 200 rotates relative to the first base 100, to drive the second folding portion 500 to rotate relative to the first folding portion 400, so that the first folding portion 400 and the second folding portion 500 switch between the unfolded state and the folded state.

Generally, the first folding portion 400 and the second folding portion 500 may be two portions of the foldable mobile terminal that can rotate relative to each other, for example, the first folding portion 400 may be a keyboard area, and the second folding portion 500 may be a display area.

In an optional solution, the first folding portion 400 may include a first housing 410 and a first display screen 420, and the first housing 410 is connected to the first base 100. Specifically, the first housing 410 and the first base 100 may be fixedly connected through a first connection piece (such as a first screw) cooperating with the first connection hole 430. The first display screen 420 is provided on the first housing 410. The second folding portion 500 may include a second housing 510 and a second display screen 520, and the second housing 510 and the second base 200 are connected. Specifically, the second housing 510 and the second base 200 may be fixedly connected through a second connection piece (such as a second screw) cooperating with the second connection hole 530. The second display screen 520 is provided on the second housing 510. Generally, the first base 100 may be fixedly connected to the first housing 410 through a fastening connection structure, a connection piece (such as a threaded connection piece), anchoring, and the like. Similarly, the second base 200 may be fixedly connected to the second housing 510 through a fastening connection structure, a connection piece (such as a threaded connection piece), anchoring, and the like.

When the rotation connection component is in the unfolded state, the first display screen 420 and the second display screen 520 are coplanar, and form a display interface of the foldable mobile terminal. When the rotation connection component is in the folded state, the first display screen 420 and the second display screen 520 are stacked. Specifically, the first display screen 420 and the second display screen 520 are disposed away from each other, thereby folding into a dual-screen mobile terminal. Generally, when switching from the unfolded state to the folded state, the second folding portion 500 needs to rotate by 180° relative to the first folding portion 400. In this case, the preset angle is 180°.

The foldable mobile terminal disclosed in the embodiments of the present disclosure may be a phone, a tablet computer, an e-book reader, a game console, or the like. A specific type of the mobile terminal is not limited in the embodiments of the present disclosure.

The above embodiments of the present disclosure mainly describe the differences between various embodiments. As long as the different optimization features of the various embodiments are not contradictory, the various embodiments can be combined to form a better embodiment. Considering the brevity of the text, details are not described herein again.

The foregoing descriptions are merely embodiments of this disclosure, but are not intended to limit this disclosure. For a person skilled in the art, the present disclosure may have various changes and variations. Any modification, equivalent replacement, or improvement made without departing from the spirit and principle of this disclosure shall fall within the scope of claims of this disclosure.

What is claimed is:

1. A rotation connection component, comprising: a first base, a second base, and a connection clamp, wherein the second base is rotationally connected to the first base through the connection clamp, the connection clamp is slidably connected to the first base, the rotation connection component has an unfolded state and a folded state, in the folded state, the connection clamp slides into the first base; in the unfolded state, at least a portion of the connection clamp slides from the first base, and the second base rotates by a preset angle relative to the first base; wherein the first base has a guide rail, and the connection clamp is slidably connected to the guide rail;

the guide rail is a first curved sliding hole provided on the first base;

the connection clamp is disposed inside the first curved sliding hole and slides along the first curved sliding hole;

an extending direction of the first curved sliding hole is the same as a rotation direction of the first base or the second base; and the connection clamp comprises two connection sub-clamps, the two connection sub-clamps are a first connection sub-clamp and a second connection sub-clamp, the first connection sub-clamp and the second connection sub-clamp are sequentially connected between the first base and the second base, the first connection sub-clamp has a second curved sliding hole, and the second connection sub-clamp is disposed inside the second curved sliding hole and matched with the second curved sliding hole by slip-fit in a rotation direction of the first base or the second base.

2. The rotation connection component according to claim 1, wherein a first locking portion is disposed inside the first curved sliding hole, a second locking portion is disposed on the connection clamp, and the second locking portion is matched with the first locking portion by position-limiting-fit in the rotation direction.

3. The rotation connection component according to claim 2, wherein the first locking portion is disposed at a tail end of the first curved sliding hole, and the second locking portion is disposed at an end of the connection clamp away from the second base.

4. The rotation connection component according to claim 1, wherein a third locking portion is disposed at a tail end of the second curved sliding hole, a fourth locking portion is disposed at an end of the second connection sub-clamp away from the second base, and the third locking portion is matched with the fourth locking portion by position-limiting-fit in the rotation direction.

5. A foldable mobile terminal, comprising: a first folding portion, a second folding portion, and a rotation connection component, wherein the rotation connection component comprises a first base, a second base, and a connection clamp, the second base is rotationally connected to the first base through the connection clamp, the connection clamp is slidably connected to the first base, the rotation connection component has an unfolded state and a folded state; in the folded state, the connection clamp slides into the first base; in the unfolded state, at least a portion of the connection clamp slides from the first base, the second base rotates by a preset angle relative to the first base; the first folding portion is connected to the first base, and the second folding portion is connected to the second base; wherein
the first base has a guide rail, and the connection clamp is slidably connected to the guide rail;
the guide rail is a first curved sliding hole provided on the first base;
the connection clamp is disposed inside the first curved sliding hole and slides along the first curved sliding hole;
an extending direction of the first curved sliding hole is the same as a rotation direction of the first base or the second base; and
the connection clamp comprises two connection sub-clamps, the two connection sub-clamps are a first connection sub-clamp and a second connection sub-clamp, the first connection sub-clamp and the second connection sub-clamp are sequentially connected between the first base and the second base, the first connection sub-clamp has a second curved sliding hole, and the second connection sub-clamp is disposed inside the second curved sliding hole and matched with the second curved sliding hole by slip-fit in a rotation direction of the first base or the second base.

6. The foldable mobile terminal according to claim 5, wherein the first folding portion comprises a first housing connected to the first base and a first display screen disposed on the first housing, the second folding portion comprises a second housing connected to the second base and a second display screen disposed on the second housing, when the rotation connection component is in the unfolded state, the first display screen and the second display screen are coplanar and form a display interface of the foldable mobile terminal, and when the rotation connection component is in the folded state, the first display screen and the second display screen are stacked.

7. The foldable mobile terminal according to claim 5, wherein the foldable mobile terminal is a mobile phone, a tablet computer, an e-book reader, or a game console.

8. The foldable mobile terminal according to claim 5, wherein a first locking portion is disposed inside the first curved sliding hole, a second locking portion is disposed on the connection clamp, and the second locking portion is matched with the first locking portion by position-limiting-fit in the rotation direction.

9. The foldable mobile terminal according to claim 8, wherein the first locking portion is disposed at a tail end of the first curved sliding hole, and the second locking portion is disposed at an end of the connection clamp away from the second base.

10. The foldable mobile terminal according to claim 5, wherein a third locking portion is disposed at a tail end of the second curved sliding hole, a fourth locking portion is disposed at an end of the second connection sub-clamp away from the second base, and the third locking portion is matched with the fourth locking portion by position-limiting-fit in the rotation direction.

* * * * *